UNITED STATES PATENT OFFICE

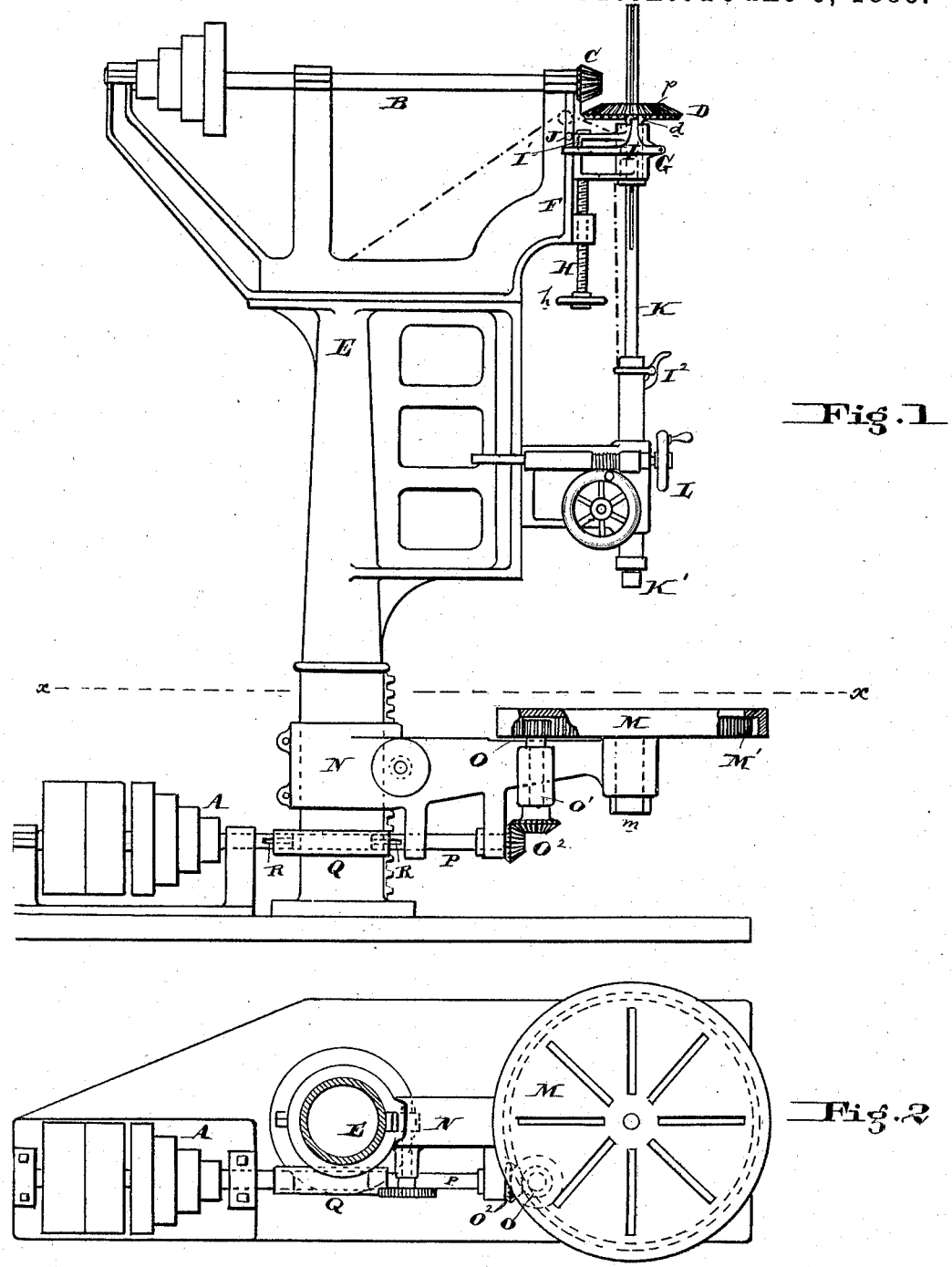

GEORGE G. MORRISON, OF PHILADELPHIA, PENNSYLVANIA.

COMBINED DRILLING AND BORING MACHINE.

SPECIFICATION forming part of Letters Patent No. 319,502, dated June 9, 1885.

Application filed January 2, 1885. (No model.)

*To all whom it may concern:*

Be it known that I, GEORGE G. MORRISON, of Philadelphia, county of Philadelphia, and State of Pennsylvania, have invented a new and useful Improvement in Machinists' Tools, of which the following is a specification.

My invention has reference to machinists' tools, but more specifically to combined drilling and boring machines; and it consists in the combination of a drilling and boring machine, both combined with the same standard of supporting-frame, so that the same motive power or counter-shaft may be used to drive either the boring or drilling mechanism, and in many details of construction, all of which are fully set forth in the following specification, and shown in the accompanying drawings, which form part thereof.

The object of this invention is to so construct a single machine that it may embody the principles of two machines required in nearly all machine-shops, and by which the expense may be greatly reduced, as well as the space required in the shop being diminished.

The combination hereinafter set forth does not in any way interfere with the machine being used simply as a drilling-machine, neither does it in any wise interfere with the machine being used as a boring-machine, and while it is possible to operate both the drilling and boring machine mechanism simultaneously, in practice they would be used alternately or one at a time.

In the drawings, Figure 1 is a side elevation of a combined drilling and boring machine embodying my invention, and Fig. 2 is a sectional plan view of same on line $x\ x$.

A is a counter-shaft, with its usual driving-pulleys and cone, by which the drill is driven.

B is the overhead horizontal shaft of the drill, and is provided on one end with cone-pulleys and upon the other end with a bevel-pinion, C.

E is the main column or frame of the machine.

K is the drill-spindle or tool-holder, and works through a bevel-wheel, D, adapted to mesh with the pinion C, the said spindle K having a keyway or groove, into which a feather or key on the said bevel-wheel D works, by which the said spindle K may be moved vertically through the said bevel-gear, but is caused to rotate with it, the said construction being that employed in all drills. The said bevel-wheel D is journaled in a sliding frame or box, G, which works upon a guide, F, of the main frame, and may be moved vertically by a hand-wheel, $h$, and screw H, so that the gear-wheel D may be moved into or out of contact with the driving bevel-pinion C. The bevel-wheel D is provided with a notch or lugs, $d$, into or between which the end of a pivoted spring lever or catch, I, is allowed to enter after the box G has been slightly lowered. When the bevel-wheel D is meshing with pinion C, the pin J of the main frame causes the lever I to be oscillated, so as to throw the same out of contact with the gear C, allowing it to rotate freely; but the moment it is lowered, so as to be free from said pinion C, the lever I leaves the said pin J, and a spring, I', draws the said lever into contact with the lugs or notches of the bevel-wheel D, and locks its spindle from rotation.

Instead of the lock just described, a simple lock (shown at $I^2$) working in a keyway of the said spindle K may be used.

K' is a tool-holder on the bottom end of the spindle K, when the said spindle is fed either automatically or by hand up and down by means of the gear L, of any of the well-known constructions.

M is a table to which the work is secured, and is pivoted or journaled at $m$ to the adjustable frame N. This table M is provided with an internal gear, M', into which a pinion, O, secured upon a vertical shaft, O', works, the said shaft O' receiving its motion from a horizontal shaft, P, by means of a bevel-gear, $O^2$, and the shaft P in turn receives its motion from the counter-shaft A by means of an adjustable sleeve, Q, which slips upon the ends of the counter-shaft A and shaft P, coupling them together through the agency of the keys or keyways R.

It is to be understood that I do not limit myself to any specific construction of drill, as the invention is to be adapted to the various makes now in the market. Neither do I limit myself to the particular means shown for connecting or disconnecting the shafts B and spindle K, for, instead of separating the gears C and D from the gear C or the gear D, they may be made fast or loose upon their respective shaft or spindles by means of a clutch or notch of any suitable construction. Likewise the connection between the counter-shaft A and the table M, by which the latter is rotated, may be greatly modified, if desired; and I would also remark that it is not necessary to my invention that this latter motion be received from the counter-shaft A, as it could equally well be received from the vertical shaft-gear with the overhead horizontal shaft B; but while any or all of these modifications are practical, and may be best adapted to some machines, I however prefer the construction shown.

Having now described my invention, what I claim as new, and desire to secure by Letters Patent, is—

1. In a combination-tool comprising a drilling and boring machine in which either may be used separately, the combination of a drill or tool spindle, mechanism, substantially as set forth, to rotate or prevent rotation of said spindle, a face-plate or table, and mechanism, substantially as set forth, to rotate or prevent rotation of said face-plate, substantially as and for the purpose specified.

2. In a combination-tool, a drill or tool spindle combined with gearing to rotate it, mechanism, substantially as set forth, to separate said gears to arrest the rotation of the spindle, and a lock to prevent the rotation of said spindle when the gears are separated, substantially as and for the purpose specified.

3. In a combination-tool, a drill or tool spindle combined with gearing to rotate it, mechanism, substantially as set forth, to separate said gears to arrest the rotation of the spindle, a lock to prevent the rotation of said spindle when the gears are separated, a face-plate, and mechanism, substantially as set forth, to rotate or prevent rotation of said face-plate, substantially as and for the purpose specified.

4. The combination of shaft B, having bevel-pinion C, frame E, having a guide, F, box G, screw H, to move said box, gear D, carried by said box, and spindle K, substantially as and for the purpose specified.

5. The combination of shaft B, having bevel-pinion C, frame E, having a guide, F, box G, screw H, to move said box, gear D, carried by said box, and a lock to prevent rotation of said gear D, substantially as and for the purpose specified.

6. The combination of shaft B, having bevel-pinion C, frame E, having a guide, F, box G, screw H, to move said box, gear D, carried by said box, lever I, spring I', pin J, and spindle K, substantially as and for the purpose specified.

7. The combination of frames E and N, face-plate M, having gear M', pinion O, shaft O', gears O², shaft P, counter-shaft A, and connecting-sleeve Q, substantially as and for the purpose specified.

In testimony of which invention I hereunto set my hand.

GEORGE G. MORRISON.

Witnesses:
R. M. HUNTER,
WILLIAM C. MAYNE.